US012621257B2

(12) United States Patent
Rensburg et al.

(10) Patent No.: US 12,621,257 B2
(45) Date of Patent: May 5, 2026

(54) SYSTEM AND METHOD FOR FACILITATING ONLINE CHAT EDITS USING USER CONFIDENCE SCORES

(71) Applicant: RingCentral, Inc., Belmont, CA (US)

(72) Inventors: Christopher van Rensburg, Portland, OR (US); Erik Dmitrievich Parland, Belmont, CA (US); Martin Arastafar, Redwood City, CA (US)

(73) Assignee: RingCentral, Inc., Belmont, CA (US)

( * ) Notice: Subject to any disclaimer, the term of this patent is extended or adjusted under 35 U.S.C. 154(b) by 0 days.

(21) Appl. No.: 18/615,805

(22) Filed: Mar. 25, 2024

(65) Prior Publication Data

US 2024/0236027 A1     Jul. 11, 2024

Related U.S. Application Data

(63) Continuation of application No. 17/247,875, filed on Dec. 28, 2020, now abandoned.

(51) Int. Cl.
| | |
|---|---|
| *H04L 51/224* | (2022.01) |
| *H04L 12/18* | (2006.01) |
| *H04L 51/04* | (2022.01) |
| *H04L 51/046* | (2022.01) |
| *H04L 67/50* | (2022.01) |

(52) U.S. Cl.
CPC ........ *H04L 51/224* (2022.05); *H04L 12/1831* (2013.01); *H04L 51/04* (2013.01); *H04L 51/046* (2013.01); *H04L 67/535* (2022.05)

(58) Field of Classification Search
CPC ... H04L 51/224; H04L 12/1831; H04L 51/04; H04L 51/046; H04L 51/063; H04L 51/066; H04L 67/535; H04L 51/216; G06F 40/166; G06F 40/169
See application file for complete search history.

(56) References Cited

U.S. PATENT DOCUMENTS

| | | | | |
|---|---|---|---|---|
| 2003/0023689 A1* | 1/2003 | Brown | ................ | H04L 12/1831 709/206 |
| 2007/0208567 A1* | 9/2007 | Amento | ................... | G10L 15/22 704/E15.04 |
| 2009/0043848 A1* | 2/2009 | Kordun | ............... | H04L 12/1831 709/205 |
| 2013/0275884 A1* | 10/2013 | Katragadda | ............. | G06F 16/29 715/753 |
| 2014/0222924 A1* | 8/2014 | Rasmussen | ........... | H04L 51/046 709/204 |
| 2015/0051908 A1* | 2/2015 | Romriell | ................. | H04L 12/66 704/235 |
| 2015/0262209 A1* | 9/2015 | Orsini | ................... | G06F 40/253 705/14.11 |
| 2020/0126561 A1* | 4/2020 | Kofman | ............... | G11B 27/031 |
| 2022/0059075 A1* | 2/2022 | Thomson | ................ | G10L 15/08 |

* cited by examiner

*Primary Examiner* — Johnny B Aguiar

(57) ABSTRACT

A method includes receiving a plurality of textual data from one or more users within an online chat group. The method also includes rendering the plurality of textual data for each user of the online chat group. The method includes further enabling one user from the online chat group to edit a textual data originated by another user from the online chat group. A notification is rendered on a graphical user interface (GUI) that the textual data originated by the another user has been edited. In response to a user selection thereof, the edit is accepted, rejected, or further edited.

21 Claims, 16 Drawing Sheets

SYSTEM AND METHOD FOR FACILITATING ONLINE CHAT EDITS USING USER CONFIDENCE SCORES

RELATED APPLICATIONS

The instant application is a continuation application and claims the benefit and priority to the U.S. application Ser. No. 17/247,875 filed on Dec. 28, 2020, which is incorporated by reference in its entirety herein.

TECHNICAL FIELD

The present disclosure relates generally to the field of computer supported meeting/conferencing. More specifically, and without limitation, this disclosure relates to systems and methods for facilitating edits to chat postings in an online group.

BACKGROUND

Recent advancements in technology, and in particular online technology, have led to an increased use of online forums to disseminate information and communicate. For example, use of various online conferences and chat groups have become prevalent in communication. In one nonlimiting example, a user of a chat communication service may create an online chat group/team to disseminate information and communicate to the members of that chat group/team.

Unfortunately, chat communications may contain errors and inaccuracies. Errors and inaccuracies may range from typographical errors to more substantive errors. For example, some errors may include grammatical errors, incorrect references to names, incorrect omission/inclusion of a negating verb, incorrect references to document number (e.g., version number), etc. Errors in chat communications may cause confusion amongst the group members and the same errors often persist in the chat histories. Conventionally, the message, once posted by the message originator, cannot be corrected, e.g., marked up, etc., by other group members.

SUMMARY

Accordingly, a need has arisen to enable group members of an online chat group to edit messages posted by other participants. In some embodiments, the chat communication system may be part of a video/audio conferencing system and in other embodiments it may be a standalone system. The chat communication system may enable group members to suggest and make edits to messages posted by other participants. In some nonlimiting examples, the group members or a subset thereof may have unrestricted ability to make suggestions and to edit posted messages, while in some embodiments, the rights of the original poster of the posted message(s) may be preserved such that any suggestion or change to the posted message is either accepted by the original poster, rejected by the original poster, modified by the original poster or sent to one or more group members for further edits and/or feedback. The communication system, in other words, enables the group members of an online chat group to collaborate on certain posted messages that may contain error(s) and inaccuracies, and, to make appropriate changes, as needed. The communication system may also calculate a score associated with each member based on the member's prior edits, the member's prior involvements, the member's background (e.g., educational background, job title, group/organization, etc.), the member's accuracy of prior edits (e.g., feedback mechanism such as thumbs up/down by other group members), etc. As such, the score is a confidence score associated with a member suggesting or making certain changes to a posted message.

In some embodiments, a method includes receiving a plurality of textual data from one or more users within an online chat group. The method may further include rendering the plurality of textual data for each user of the online chat group. One user from the online chat group is enabled to edit a textual data originated by another user from the online chat group. A notification is rendered on a graphical user interface (GUI) that the textual data originated by another user has been edited. In response to a user selection thereof, the edit is accepted, rejected, or further edit is made to the textual data.

The method may further include enabling the another user to modify the textual data. In some embodiments, in response to a user selection thereof, a comment associated with the edit is inserted. In some nonlimiting examples, the comment is rendered to a subset of the users within the online chat group. It is appreciated that the user selection is received from the another user originating the textual data according to some embodiments. According to some nonlimiting examples, the online chat group is within an online conferencing environment. The textual data may be transcription of a video or audio conference.

In some embodiments, the method may further include rendering additional notification on the GUI. The additional notification identifies the one user editing the textual data. It is appreciated that the edit to the textual data may be rendered to the one or more users.

In some embodiments, the method includes calculating a confidence score associated with the one user, wherein the confidence score reflects the accuracy of the edit to the textual data. It is appreciated that the confidence score may be calculated based on prior edits made by the one user, a relationship between the one user and other users within the online chat group, or expertise background of the one user in comparison to a content of the textual data.

In some embodiments, the method further includes processing the textual data using a natural language processing. The textual data may be modified based on the processing and the another user may be notified that the textual data has been modified.

It is appreciated that in some embodiments, the method further includes processing electronic communication within the online chat group and outside the online chat group to identify a source of confusion associated with the textual data. The textual data may be modified based on the processing and the identification of the source of confusion. The another user may be notified that the textual data has been modified.

These and other features and aspects of the concepts described herein may be better understood with reference to the following drawings, description, and appended claims.

BRIEF DESCRIPTION OF DRAWINGS

FIG. 2I shows the first user reviewing edits for prior posted messages according to some embodiments.

DETAILED DESCRIPTION

Figure 1:
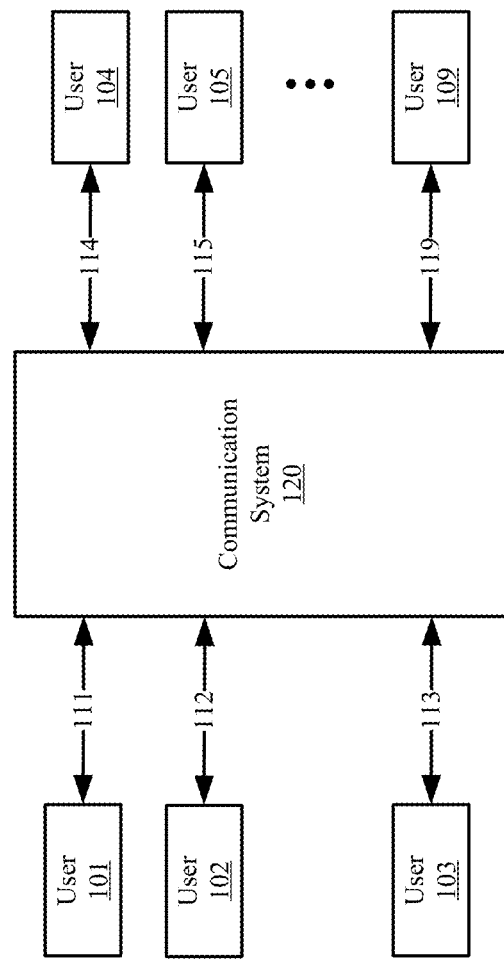
FIG. 1 is a diagram showing a communication system according to some embodiments.

The example embodiments described herein are directed to a communication system configured to facilitate communication between online users. Communication may be through an online collaboration tool, online forum, online group, online team, webinar, chat team, etc. The communication system may also facilitate communication between users via telephony and/or video conferencing, etc. In some embodiments, the audio exchanges between the users may be transcribed and displayed in a chat environment.

The communication system is configured to facilitate data exchanges, e.g., audio data, video data, content data (e.g., PowerPoint®, Word®, Portable Document Format (PDF), etc.), messaging (e.g., instant messaging), etc., amongst users. It is appreciated that the term "user(s)" generally refers to participants of a communication session, whether as host, invitee(s) or team member(s). It is also appreciated that the term "user" is used interchangeably with "member" or "participant" throughout the application.

A host, an administrator or any online user may create an online group/team using the communication system. For example, a user may create an online group or team via a chat function of the communication system. As another example, a user may create an online group for a video conferencing session. It is appreciated that the term "group" or "team" has been used interchangeably throughout the application.

Once an online team has been created, one or more members of the team can share electronic data/content with other users (i.e. team members). For example, a team member (whether the host or another team member) may post content and messages to share with other team members.

One or more users within an online chat group may encounter errors and/or inaccuracies associated with one or more posted messages. It is appreciated that the terms "errors" and "inaccuracies" are used interchangeably throughout the application. The communication system, according to some embodiments, enables a user within the online chat group (i.e. originator of the posted message or a user other than the originator of the posted message) to correct the posted message that is perceived to contain errors. It is appreciated that the communication system may be a browser-based system. According to a nonlimiting example, a graphical user interface (GUI) is presented to a user (either in response to a user selection thereof or automatically) where the user can edit one or more posted messages by the user itself or by another user. The GUI may be within the online chat environment or presented in a separate window. The user may edit the posted messages of other users as if they were originated by the user itself. In some embodiments, the changes being made are rendered in a marked-up format, whereas in other embodiments, the changes being made are rendered in a clean format. It is appreciated that the user may select a view, e.g., marked-up or clean. In addition to the changes made, the user may insert comments or request feedback from the originator of the message or from other users within the online chat group. Once edits are made, the user may activate a button to post the changes (either to the originator of the posted message that has been changed or to a subset of the users within the online chat group).

It is appreciated that in some embodiments, a subset of the users within the online chat group may have unrestricted editing abilities, such that changes being made are final without formal acceptance by the originator of the posted message. However, the unrestricted or tiered abilities to make edits to posted messages may be managed by the host or administrator who has created the online group chat or by a user having power delegated to them from the host, as an example.

It is appreciated that in some embodiments, the changes or suggestions made by a user are provided to the originator of the posted message. In other words, the originator of the posted message is notified of certain inaccuracies and that changes are being made and/or proposed to the posted message(s). The originator of the posted message may similarly use a GUI to accept the changes, to reject the change, to make further edits, to insert a comment for a subset of the users, to request feedback, to send a message regarding the edits to a user (any user of the online chat group), or to send a thank you message to the user suggesting/making the changes, etc. It is appreciated that the edits may also be rendered to other users of the online chat group and, as such, other users may further collaborate in making additional changes as needed, utilizing a similar GUI. It is further appreciated that changes may be rendered to users of the online chat group, and any user or a subset of the users may further provide feedback on the proposed changes, e.g., thumbs up, thumbs down, etc. According to some nonlimiting examples, the status of the changes, e.g., whether accepted, rejected, further edited, etc., may be displayed to the user that proposed/made the changes.

Accordingly, each user of the online chat group develops a history that is tracked, based on prior edits (either within the same online chat group or other online chat groups), based on accuracy of the changes proposed by the user from prior edits, based on the user's background (e.g., user's title, user's education, user's organization/team, etc.), based on the relationship of the user to other users and the host of the online chat group, based on the alignment of the content in the posted messages and the user's expertise, etc. The tracked history can be used to calculate a confidence score associated with each user. It is appreciated that the confidence score may be calculated based on a number of different factors, e.g., number of typo corrections that have been accepted/rejected, the number of content corrections that have been accepted/rejected, etc. The factors used to calculate the confidence score may be weighted differently, e.g., the number of accepted/rejected corrections for content may be weighted higher than typographical corrections. The confidence score for a user can be used by other users to make an informed decision on the appropriate course of action regarding messages those other users have originated and to which changes have been made or proposed by the user, e.g., accepting the changes, rejecting the changes, proposing additional edits, requesting input and feedback from other users of the online chat group, etc. For example, if a user has a low confidence score, reflecting the fact that the user is often making inappropriate changes to posted messages, then perhaps the more appropriate course of action is to investigate the changes, whereas changes being proposed by a user with a higher confidence score may be accepted with minimal investigation and with more reassurance that the change is the appropriate course of action.

It is appreciated that in some embodiments, machine learning techniques, such as natural language processing (NLP) and sentiment analysis, is used to parse the posted messages. The context for each posted message may be determined, and based on that context, it may be determined whether changes to a given posted message are appropriate to improve the accuracy, correctness, or general quality of the message. For example, a posted message may read "I have been so busy I had time to review the document." Processing the message using NLP indicates that the originator of the message probably inadvertently left out "didn't" from the posted message. As such, appropriate changes to the posted message may be suggested to the originator of the posted message or such changes may automatically be made by the communication system. Moreover, in some embodiments, monitoring communication between a subset of the users of the online chat group (within the chat environment or outside) may reveal that there is confusion with respect to a posted message. For example, a posted message may reference an attached document with the wrong file name. Discussions within the online chat environment or outside (e.g., audio calls, emails, etc.) may reveal the discrepancy that is causing the confusion. As such, remedial actions may be taken, e.g., originator of the posted message may be notified to take appropriate action, the posted message may be modified, etc.

Before various example embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing concepts, and the terminology is not intended to be limiting. Unless defined otherwise, all technical and scientific terms used herein have the same meaning as commonly understood by those skilled in the art to which the embodiment pertains.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the detailed descriptions that follow are presented in terms of procedures, methods, flows, logic blocks, processing, and other symbolic representations of operations performed on a computing device or a server. These descriptions are the means used by those skilled in the arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical, optical or magnetic signals capable of being stored, transferred, combined, compared, and otherwise manipulated in a computer system or computing device or a processor. These signals are sometimes referred to as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "processing," "calculating," "updating," "instantiating," "identifying," "rendering," "utilizing," "launching," "calling," "starting," "accessing," "sending," "conferencing," "triggering," "ending," "suspending," "terminating," "monitoring," "displaying," "removing," "enabling," "accepting," "rejecting," "editing," "modifying," "inserting," "notifying," or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated that present systems and methods can be implemented in a variety of architectures and configurations. For example, present systems and methods can be implemented as part of a distributed computing environment, a cloud computing environment, a client server environment, hard drive, etc. Example embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

Computer storage media can include volatile and non-volatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, solid state drives, hard drives, hybrid drive, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

FIG. 1 is a diagram showing a communication system according to some embodiments. The communication system 120 may be used to form an online group/team and enables the members of the online group to communicate with one another (i.e. electronic communication such as videoconferencing, audioconferencing, electronic messages, document sharing, etc.). For illustrative purposes that should not be construed as limiting the scope of the embodiments, a team member (whether the host or another team member) may post electronic messages to share with other team members. It is appreciated that electronic messages may be textual data that may be posted within an online chat environment of the communication system 120 and shared between the users. For example, any user of the online group (i.e. users 101, 102, 103, 104, 105, . . . , 109) may post or communicate data with other users of the group after the online group is formed. In one nonlimiting example, user 101 may communicate by sharing content and/or posting electronic messages 111 for other users of the online group using the conferencing system 120. Similarly, users 102-109 may communicate by sharing content and/or posting electronic messages 112-119 to share with other users of the online group using the conferencing system 120.

It is appreciated that in some embodiments, electronic messages that are not textual may be converted into textual format and displayed for the users. For example, an audio portion of a video conference may be transcribed and posted as electronic messages, in a similar manner to a court transcript.

It is appreciated that one or more users 101-109 within an online chat group may encounter errors and/or inaccuracies associated with one or more posted electronic messages. The communication system 120 enables a user within the online chat group (i.e. originator of the posted message or a user other than the originator of the posted message) to correct the posted message that is perceived to contain errors. In some embodiments, the originator of the posted message (whether posting electronic messages within the online chat environment or whether participating in a video or audio conference session from which their speech is transcribed to text and posted as electronic messages within the online chat environment) may be notified that a change to the posted electronic message has been proposed or made. In some nonlimiting examples, the originator of the message is enabled to take remedial action to correct the errors, e.g., by accepting the changes, by modifying the changes, by asking for more feedback from other users within the online chat group, etc.

In some embodiments, a subset of the users within the online chat group may have unrestricted abilities or tiered ability to make certain changes to the posted electronic messages. For example, a subset of the users 101-109 may have unrestricted authority (i.e. provided by the administrator or the host who has created the online chat group) to make changes to any of the posted electronic messages without requiring a formal acceptance by the originator of the posted electronic message, while in other embodiments the changes are not accepted unless the originator of the posted messages or the host approves the changes. In yet other embodiments, a tiered authority may be provided wherein certain changes by a user may be made without requiring approval from the originator of the posted electronic message while other changes cannot be made without the approval (e.g., typographical changes may be made without approval while substantive changes cannot be made without approval). It is also appreciated that different users of the online chat group may be given different authorities to make changes, e.g., some users may have unrestricted authority to make changes while other users have limited authority to make changes and yet other members may be given no authority to make changes.

Figure 2A:
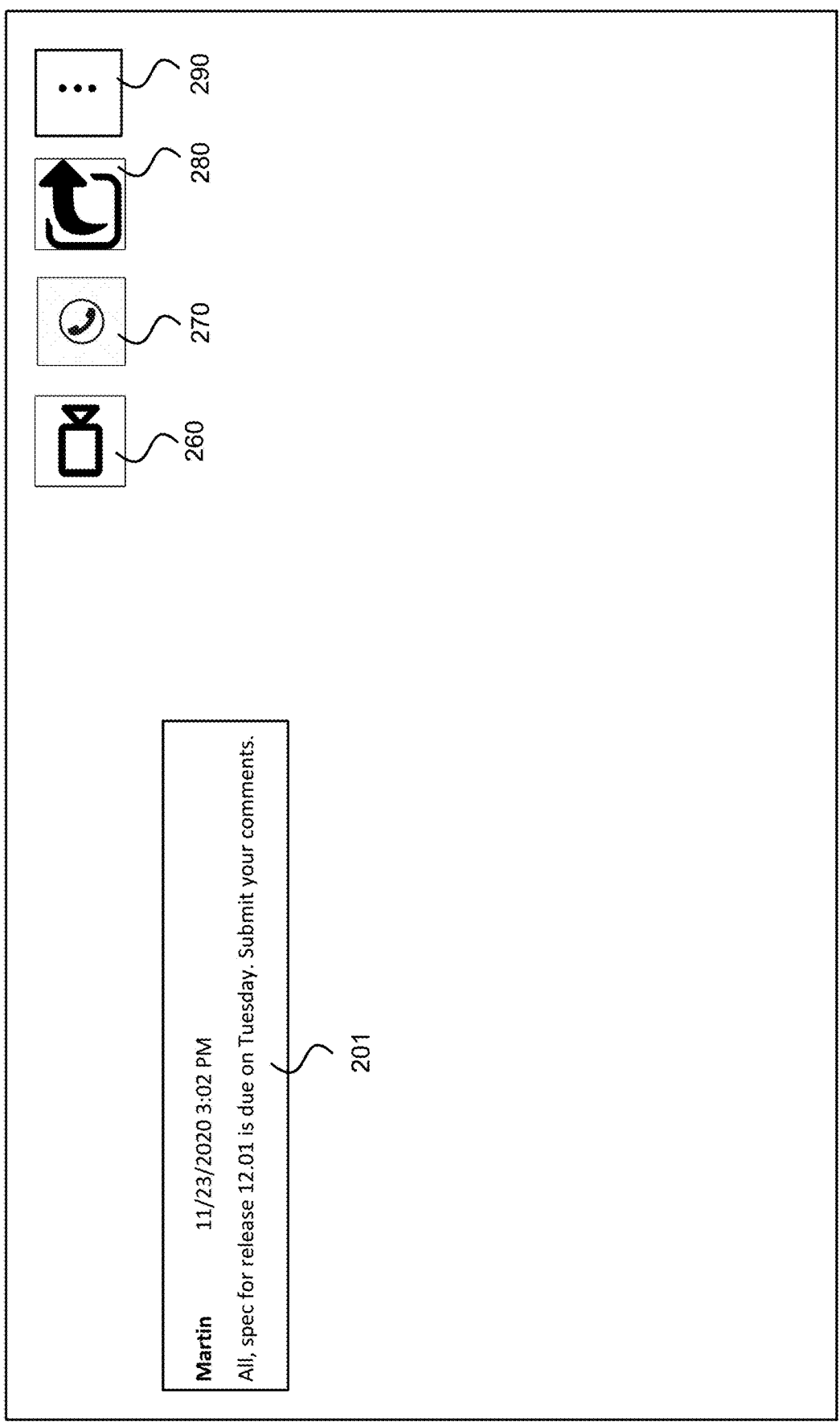
FIG. 2A shows a first user of the communication system posting a message in an online chat group according to some embodiments.

FIG. 2A shows a GUI for a first user (i.e., Martin) of the communication system posting a message in an online chat group, according to some embodiments. The communication system 120 renders a GUI for posting electronic messages. In this nonlimiting example, the user "Martin" has posted an electronic message 201 on Nov. 23, 2020 at 3:02 PM to other users of the online group that states: "All, spec for release 12.01 is due on Tuesday. Submit your comments." The electronic message 201 is posted and displayed for each user of the online group. Martin may also be referred to as the originator of the posted electronic message 201. It is appreciated that the communication system 120 may also include other functionalities. For example, an icon 260, once activated, initiates a video call to all participants of the team; an icon 270, once activated, initiates an audio call to all participants of the team; an icon 280, once activated, shares content and/or electronic message(s) with others; and icon 290 may provide additional functionalities once selected.

Figure 2B:
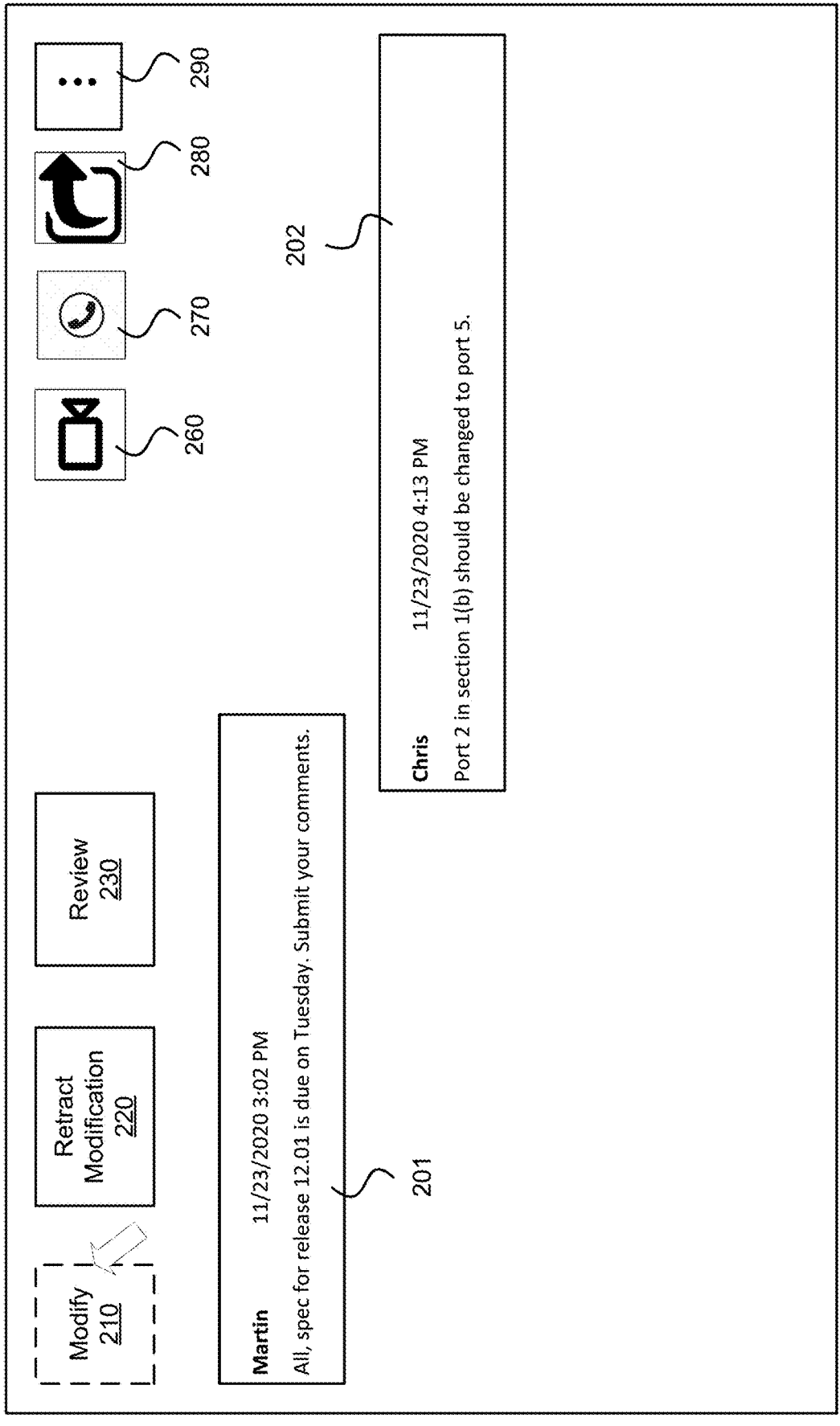
FIG. 2B shows a second user of the communication system posting a message using the communication system according to some embodiments.

FIG. 2B shows a second user (i.e., Chris) of the communication system posting a message using the communication system according to some embodiments. In this nonlimiting example, the second user "Chris" posts an electronic message 202 in response to the electronic message 201. However, Chris has noticed errors in the prior posted messages and wishes to correct the errors. It is appreciated that the prior posted messages may be by a user other than Chris and/or it may be the prior posted messages by Chris himself. In this nonlimiting example, Chris has noticed errors in the prior posted messages by Martin and wishes to make appropriate corrections. Accordingly, a modify 210 icon is activated to enable Chris to launch a GUI enabling him to edit the prior posted messages. It is appreciated that once changes are made, a retract modification 220 icon may be activated to retract the changes being made by the user (i.e., Chris in this example), while activating the review 230 icon enables the user to review the changes that have been made or are being proposed. For example, activating the review 230 icon enables Chris to review the changes that have been made by Chris and/or other users (in this example there are none, but in other nonlimiting examples, other users may have made changes prior to Chris). It is appreciated that the embodiments are described with respect to activating various icons to make changes, to review, to retract, etc., for illustrative purposes and should not be construed as limiting the scope of the embodiments. For example, in some embodiments no icon may be needed to make changes and the user may simply click within the posted electronic message 201 box to start typing and making changes.

Figure 2C:
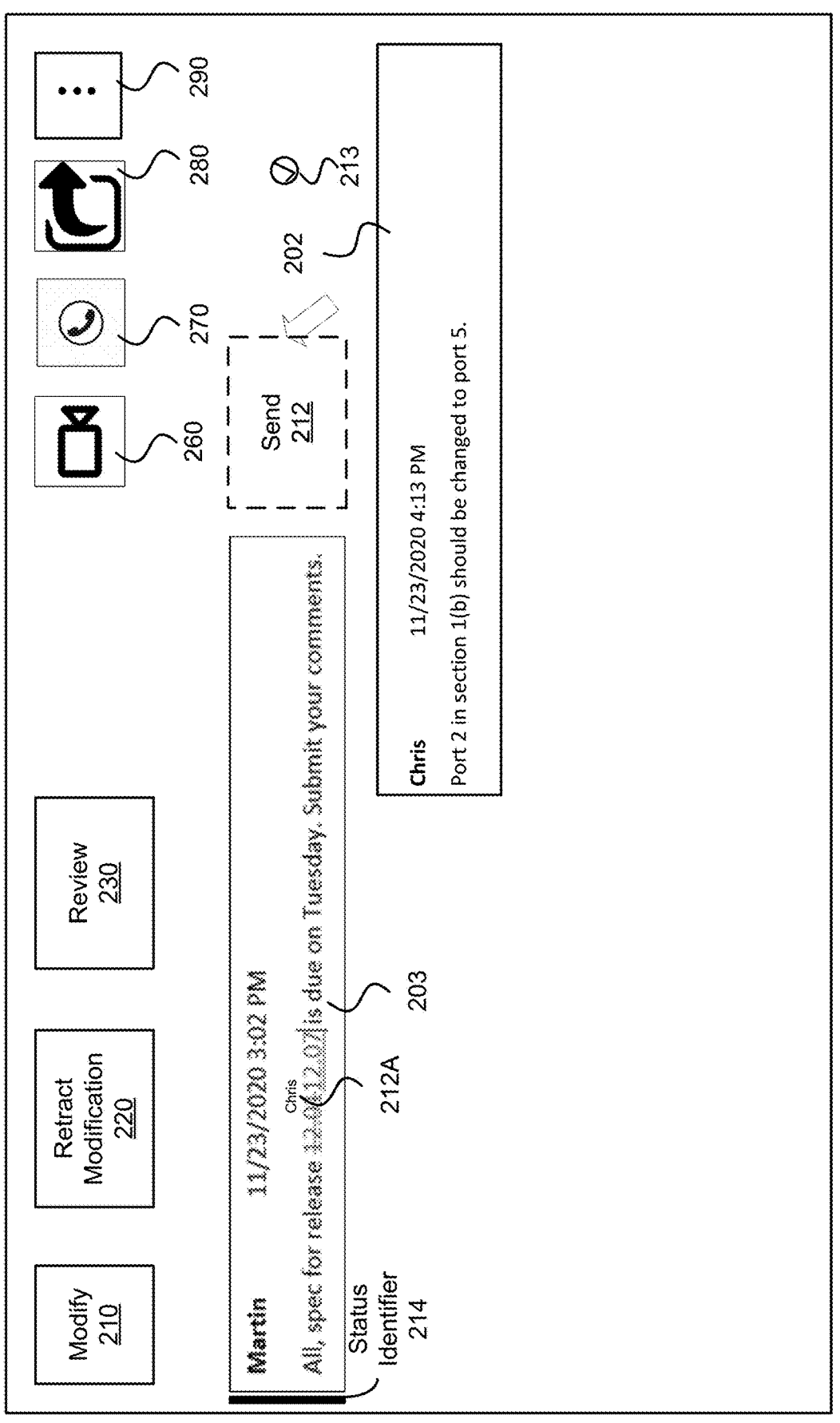
FIG. 2C shows the second user of the communication system editing a prior posted message according to some embodiments.

FIG. 2C shows the second user, Chris, of the communication system editing a prior posted message 201 according to some embodiments. In this nonlimiting example, Chris makes changes to the release number from 12.01 to 12.07 to form a modified posted electronic message 203. It is appreciated that the changes may be displayed as marked-up where the added material are displayed as underlines and the deleted material are displayed as strikethroughs. In some nonlimiting examples the identity of the user, in this example Chris, that has proposed or made changes to the posted electronic messages may be displayed in close proximity to the changes being made or proposed. For example, the name Chris 212A appears above the changes that are being proposed or made. In some nonlimiting examples, a status identifier may be used for the posted electronic messages that are changed. For example, the status identifier 214 may be used to show that the posted message by Martin has been changed or a change is proposed. It is appreciated that the user making the changes, e.g., Chris in this example, may send the proposed changes, once made, by activating a send 212 icon. In other embodiments, the proposed changes may be displayed without a need to activate the send 212 icon and displayed once other users are within the online chat environment. According to some embodiments a notification identifier 213 may be used to illustrate graphically whether the changes have successfully been posted and/or whether the originator of the posted message has been notified that the changes are made.

Figure 2D:
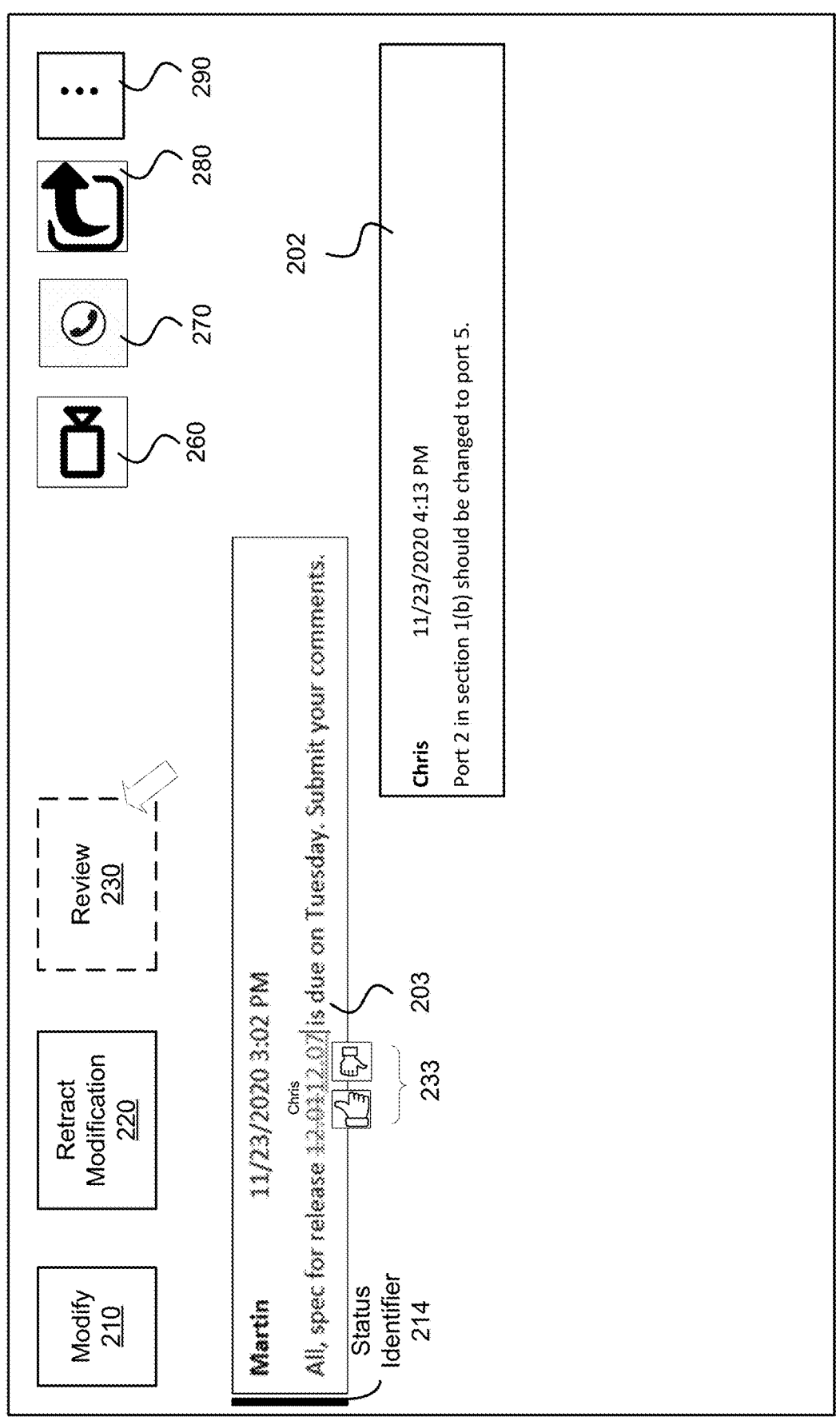
FIG. 2D is a GUI rendered to the first user of the communication system according to some embodiments.

FIG. 2D is a GUI rendered to the first user, Martin, of the communication system, according to some embodiments. In this illustrative example, the status identifier 214 is displayed illustrating to Martin, the originator of the posted message 201, that changes have been proposed or made to the posted message 201 to form the posted message 203. In this nonlimiting example, Martin may view the changes by activating the review 230 icon or the changes may automatically be rendered as marked-up on the GUI. In this example, a user that has made changes or has proposed changes to the posted message may be identified. For example, in this example, the name of the modifier (i.e. Chris) may be displayed above the changes to the posted message. The posted message originator may provide feedback to the changes by making an appropriate selection of the feedback icon 233. For example, activating a thumbs up icon indicates that the changes are appropriate while activating a thumbs down icon indicates that the changes are not appropriate. The feedback may be used to generate a confidence score associated with each user and is discussed in greater detail later in the specification. It is appreciated that other users may provide their feedback to the edited message(s). For example, in some nonlimiting examples, content may be edited by a participant and approved by the participant originating the message, however, other users may dislike the edit, resulting in the confidence score of the message originator and the editor to be lowered.

It is appreciated that in some nonlimiting examples, the user posting a message may mark the message as not editable by other users, or alternatively, as editable only by a subset of the users. In some embodiments, the communication system may mark a message as not editable based on the content of the posted message. For example, in some embodiments, the communication system may evaluate the content of the posted message and compare it to other communications, e.g., email exchanges, phone calls, other chat messages, etc., in order to identify definitive information within those other communications (i.e., if there is a match, then the definitive information from the other communications can be used to make the post uneditable; if there is a mismatch, then the definitive information from the other communications can be used to make the post editable). The definitive information is a type of authoritative information that is final, definite and should not be overridden because its content has been verified and determined to be accurate. Consequently, any content found in posted messages that matches the definitive information found from definitive source is marked as uneditable and/or made uneditable to other users. In contrast, the content of the posted message that does not match the definitive information found from definitive sources is editable. For example, the posted message may be made editable when a due date for completion of an Information Technology (IT) service ticket, which is mentioned by a user within the content of a posted message, is compared to the hard due date for competition that is listed within a comprehensive and definitive service ticketing system and the comparison results in a mismatch. In this example, the comprehensive service ticketing system serves as the source of definitive information. In some embodiments, the other source(s) of communication may be used by the system to actively suggest corrections or edits to posted message based on the definitive information. It is appreciated that in some embodiments, multiple sources of communications (e.g., ticketing systems, Customer Relationship Management (CRM) systems, emails, etc.) may be cross-referenced in order to determine definitive information (i.e., uneditable message(s)) and/or overriding information (i.e., editable messages). According to some embodiments the communication system may mark a message as editable by a particular participant, e.g., Chris only in this example, based on other communications, e.g., email exchanges, telephone calls, meetings, etc. As such, the particular participant may be invited to edit the posted message.

Figure 2E:
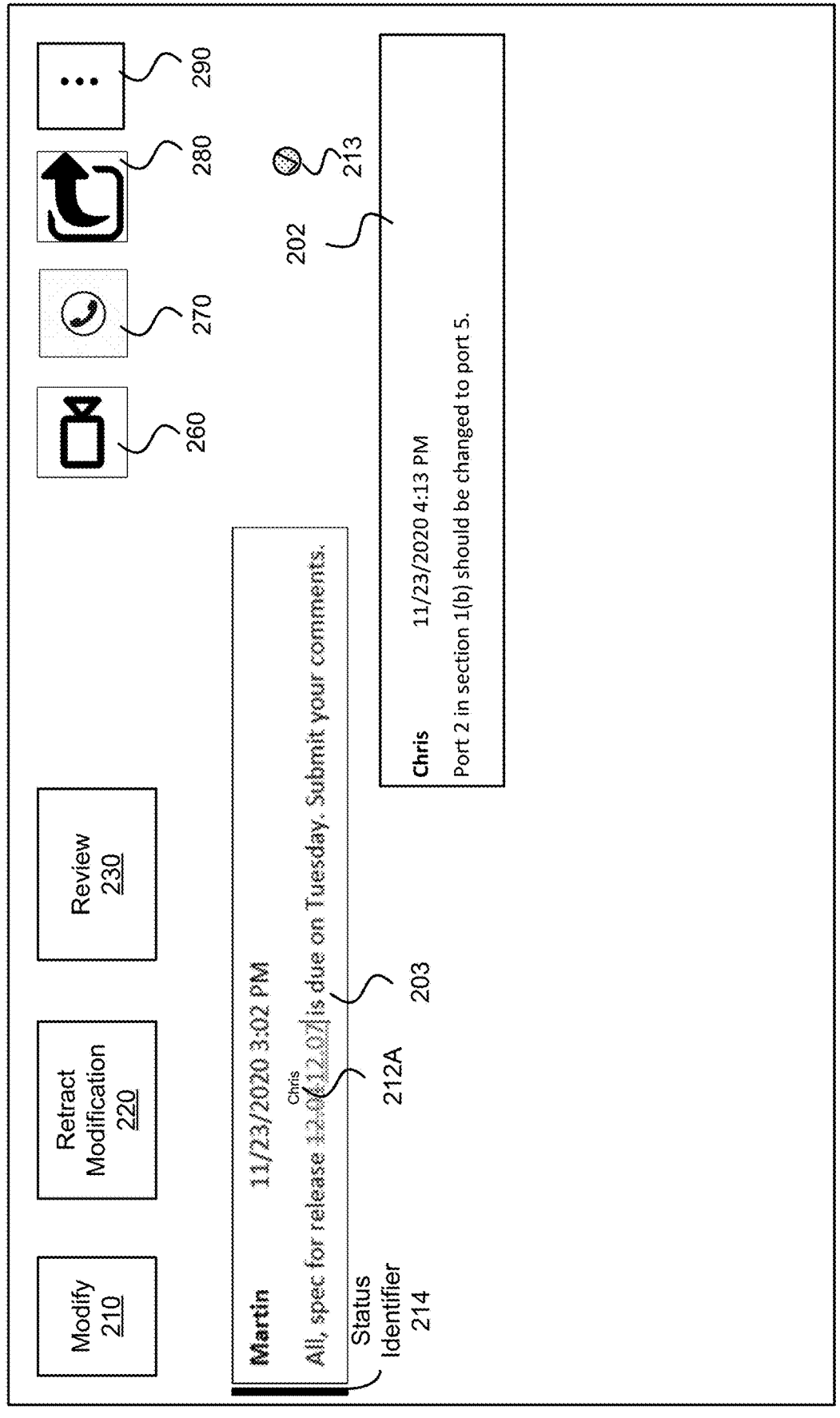
FIG. 2E is a GUI rendered to the second user of the communication system according to some embodiments.
Figure 2F:
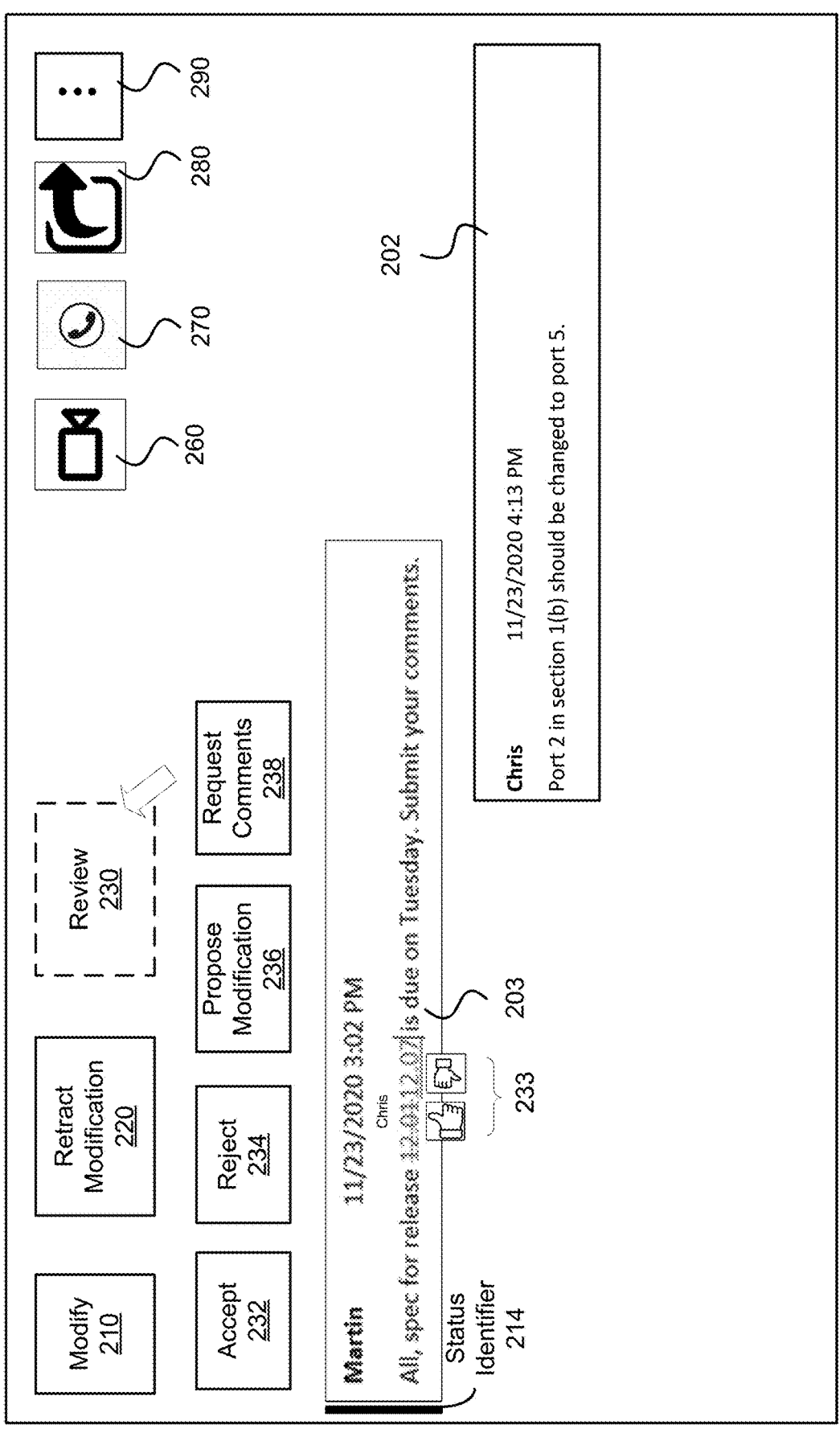
FIG. 2F are options available to the first user with respect to the edits according to some embodiments.

In this example, Martin activates the review 230 icon to review the changes being proposed or made by Chris, which is discussed in greater detail below with respect to FIG. 2F. Referring now to FIG. 2E, a GUI rendered to the second user, Chris, of the communication system, according to some embodiments, is shown. In this example, the notification identifier 213 is shaded to illustrate the changes being proposed by Chris have been viewed by Martin. Referring now to FIG. 2F, options available to the first user with respect to the edits, according to some embodiments, are shown. In this nonlimiting example, activating the review 230 icon may present additional options to the message originator Martin. For example, Martin may accept the changes by activating the accept 232 icon, reject the changes by activating the reject 234 icon, propose additional modification by activating propose modification 236 icon, or request feedback from Chris or other users within the online chat group by activating the request comments 238 icon. It is appreciated that comments provided in response to activating the request comments 238 icon may be received and rendered on a GUI of the user requesting the comment. In some nonlimiting examples, the comments provided in response to activating the request comments 238 icon may be emailed to the user requesting the comment or it may be rendered in a private chat messaging between the two users. It is appreciated that the icons, as shown, are for illustrative purposes and not intended to limit the scope of the embodiments. For example, accepting the changes, rejecting the changes, proposing modification, requesting comments, etc., may be done without activating any icons and by activating a right click button of the mouse to reveal a dropdown menu from which one of the aforementioned options may be selected.

Figure 2G:
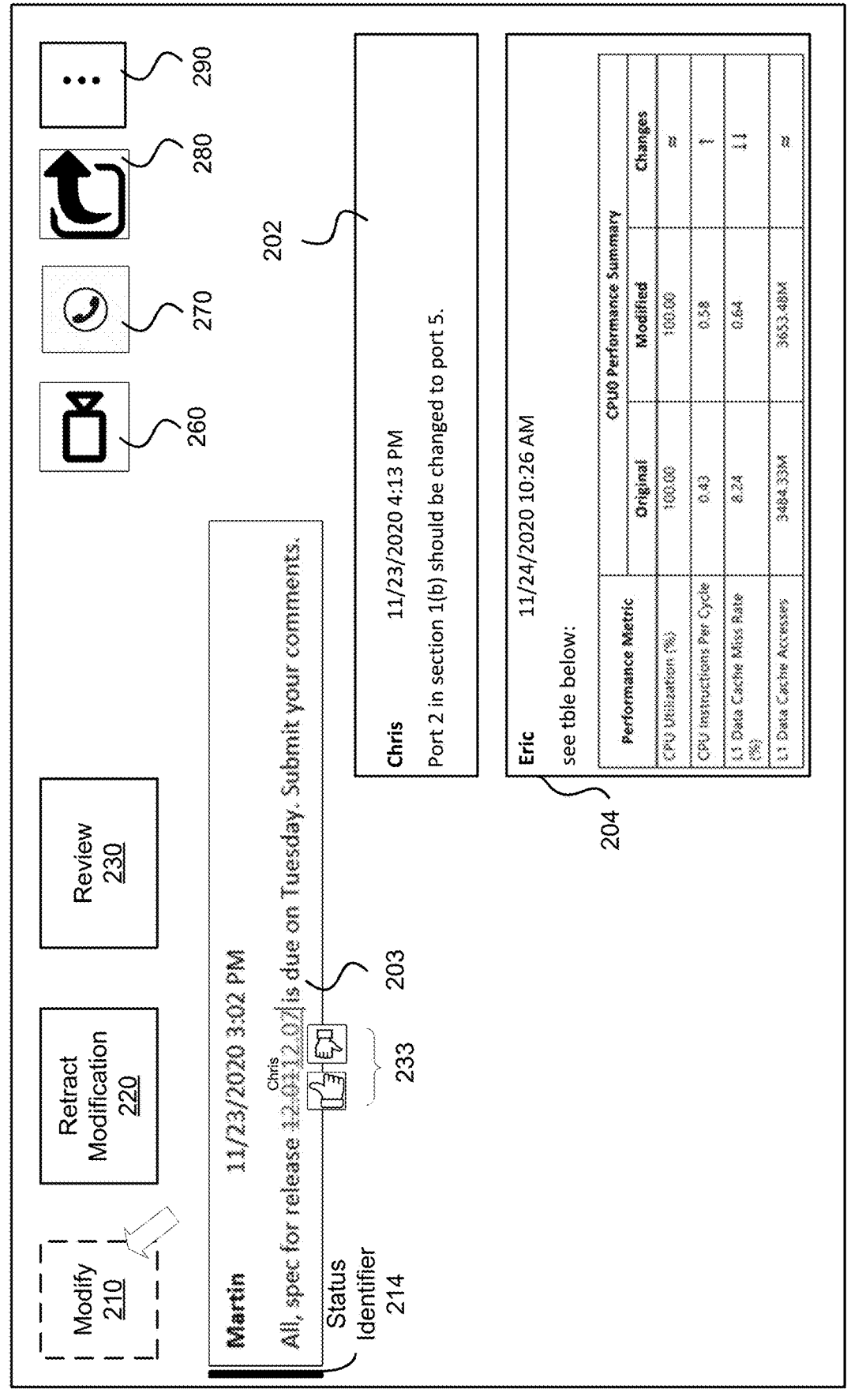
FIG. 2G shows a third user posting messages using the communication system according to some embodiments.

Referring now to FIG. 2G, a third user (i.e. Eric) posting messages using the communication system, according to some embodiments, is shown. In this illustrative example, Eric may post an electronic message 204. Moreover, it is appreciated that the GUI displays prior posted electronic messages to Eric. In some embodiments, the prior electronic messages may be displayed as marked-up along with the identity of the user that has proposed or made changes to the posted electronic messages. In this nonlimiting example, Eric views that the electronic posted message by Martin has been changed or changes have been proposed by Chris. Moreover, Eric may similar to Martin, provide feedback on whether the proposed changes are appropriate or not by activating the feedback icon 233.

Figure 2H:
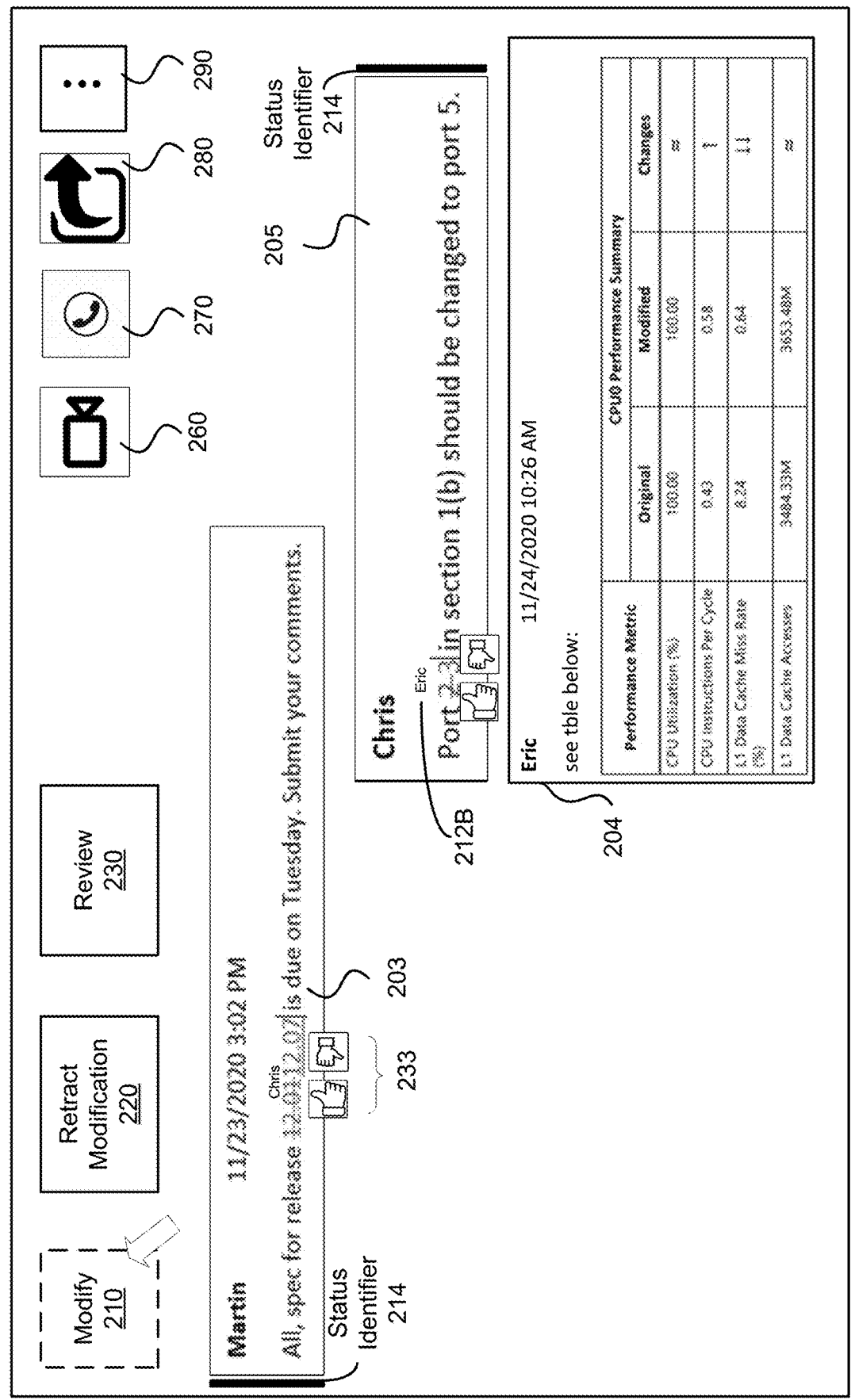
FIG. 2H shows edits being made by the third user of the communication system according to some embodiments.
Figure 21:
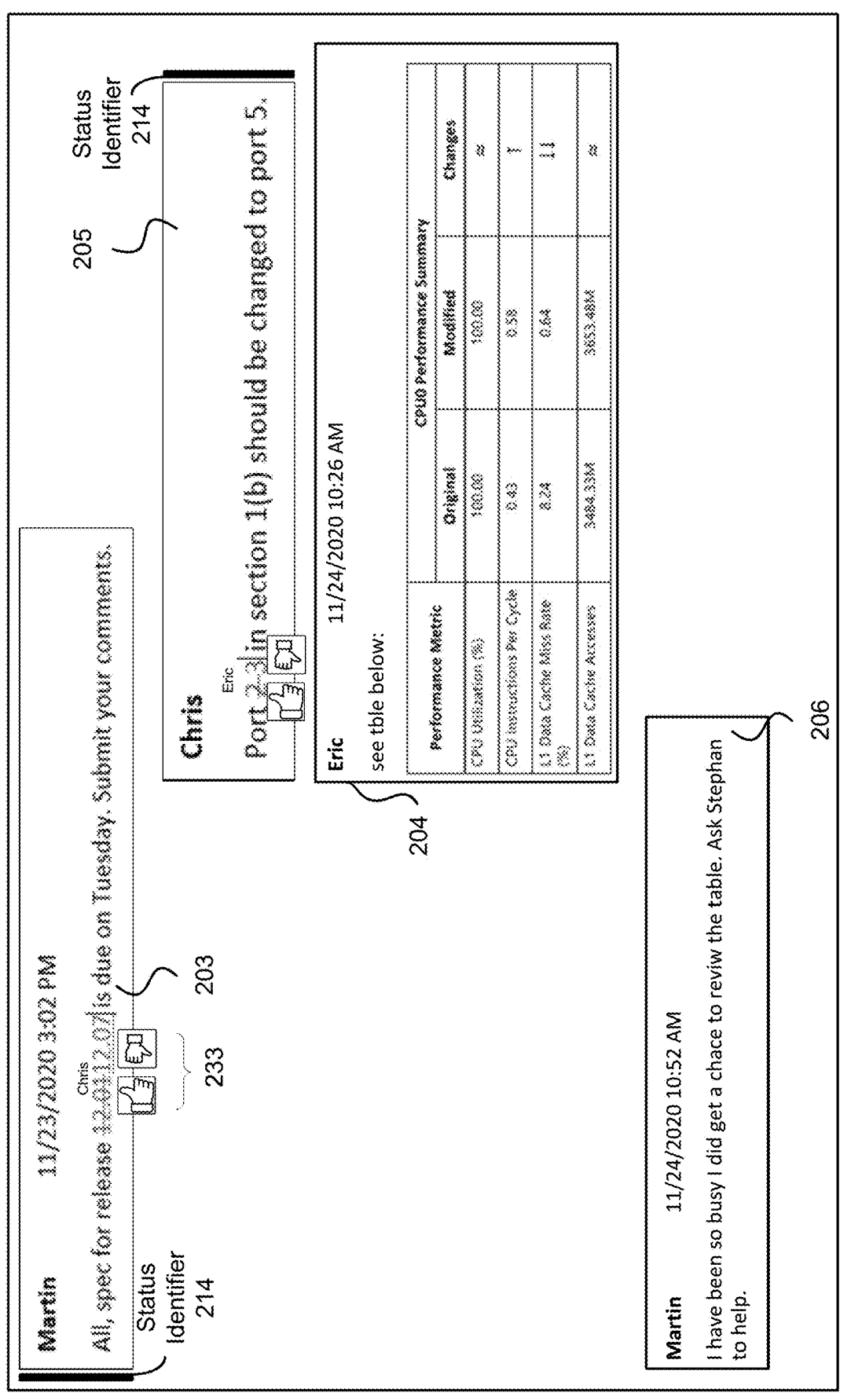

Referring now to FIG. 2H, edits being made by the third user, Eric, of the communication system, according to some embodiments, are shown. In this nonlimiting example, Eric may notice inaccuracies associated with prior posted electronic messages by Martin or Chris. In this example, Eric perceives the port number to be erroneous and proceeds to make and propose changes to the posted message 202 to form a modified posted message 205, as described above. A status identifier 214 also displays and flags the posted message to indicate that the posted message has been modified. Moreover, the identity of the modifier who has made the changes or is proposing the changes, in this example Eric, may be reflected in close proximity to the changes. In this example, the identity 212B of the modifier to the posted electronic message 202 is displayed and forms the modified posted message 205.

Figure 2J:
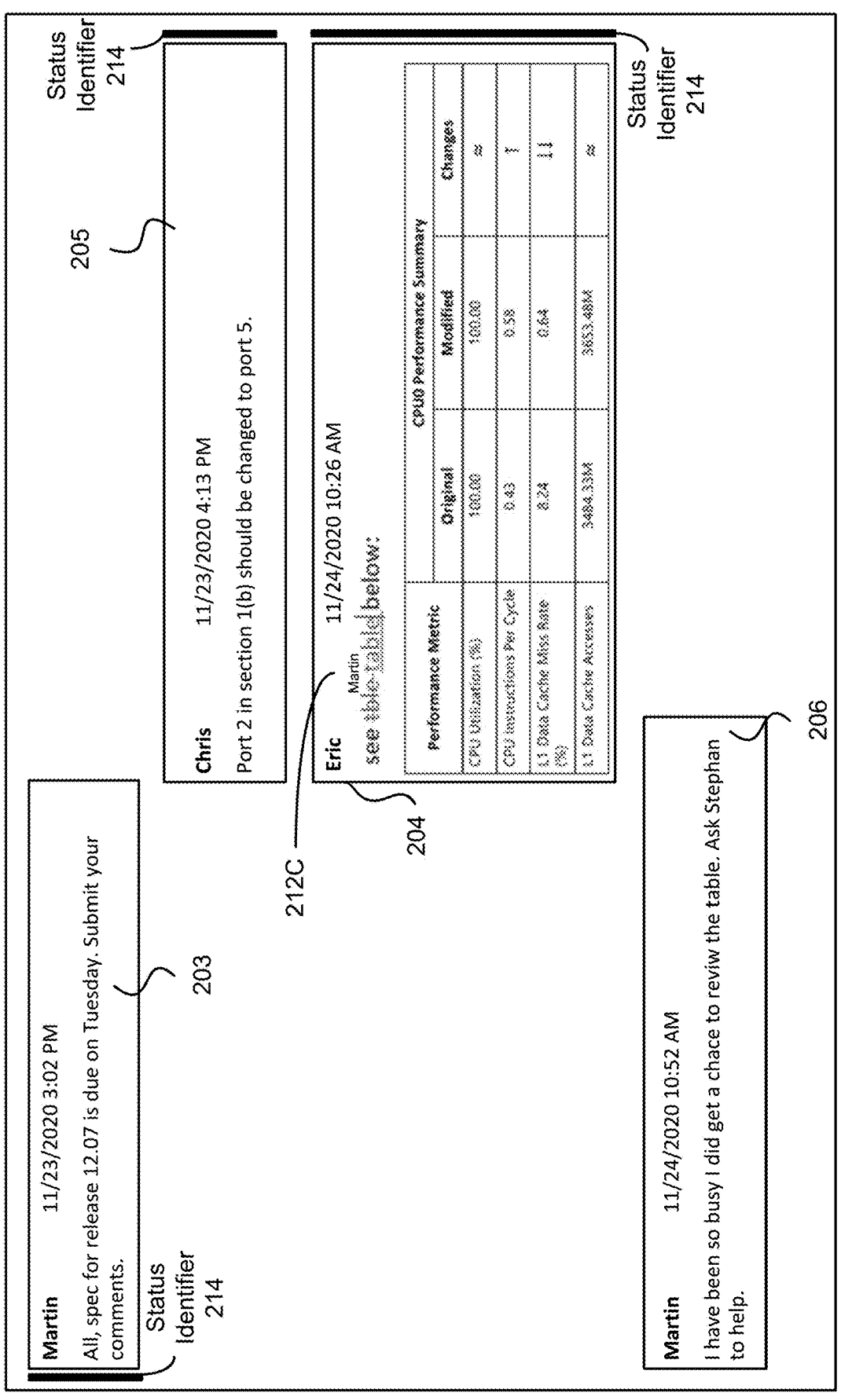
FIG. 2J shows remedial actions by the first user with respect to the edits according to some embodiments.

Referring now to FIG. 2I, the first user Martin reviewing edits to prior posted messages, according to some embodiments, is shown. In this example, Martin posts another electronic message 206. It is appreciated that the icons, as described above, are not illustrated for simplicity. In this nonlimiting example, changes being proposed or being made by other users within the online chat group may be displayed to Martin. It is appreciated that the edits may be accepted, rejected, modified, etc., as described above in FIGS. 2D and 2F. It is appreciated that a confidence score of the message originator may decrease if the message originator approves wrong edits or rejects correct edits. Similarly, a confidence score of the message editor may decrease if proposed edits are wrong and the confidence score may increase if the proposed edits are correct. Referring now to FIG. 2J, remedial action by the first user with respect to the edits according to some embodiments is shown. In this example, Martin may have reviewed the changes and accepted the changes being proposed to change the release version from 12.01 to 12.07, whereas rejecting changing the port number from 2 to 3. The changes being accepted and rejected may be shown in clean form now. However, a user within the online chat group may select to activate a viewing option to display the history of the changes to any of the posted electronic messages. For example, a user may activate the status identifier 214 next to the posted messages to show the history of changes to that posted electronic message. In this example, Martin additionally has made changes to Eric's posted electronic message 204 to correct the spelling of "tble" to "table". As such, the changes may be displayed as strikethroughs and underlines. Once the changes are made, Martin's identity 212C may be rendered in close proximity to the changes that are made and the status identifier 214 may be flagged to illustrate that changes are made or proposed to the electronic message 204.

Figure 2K:
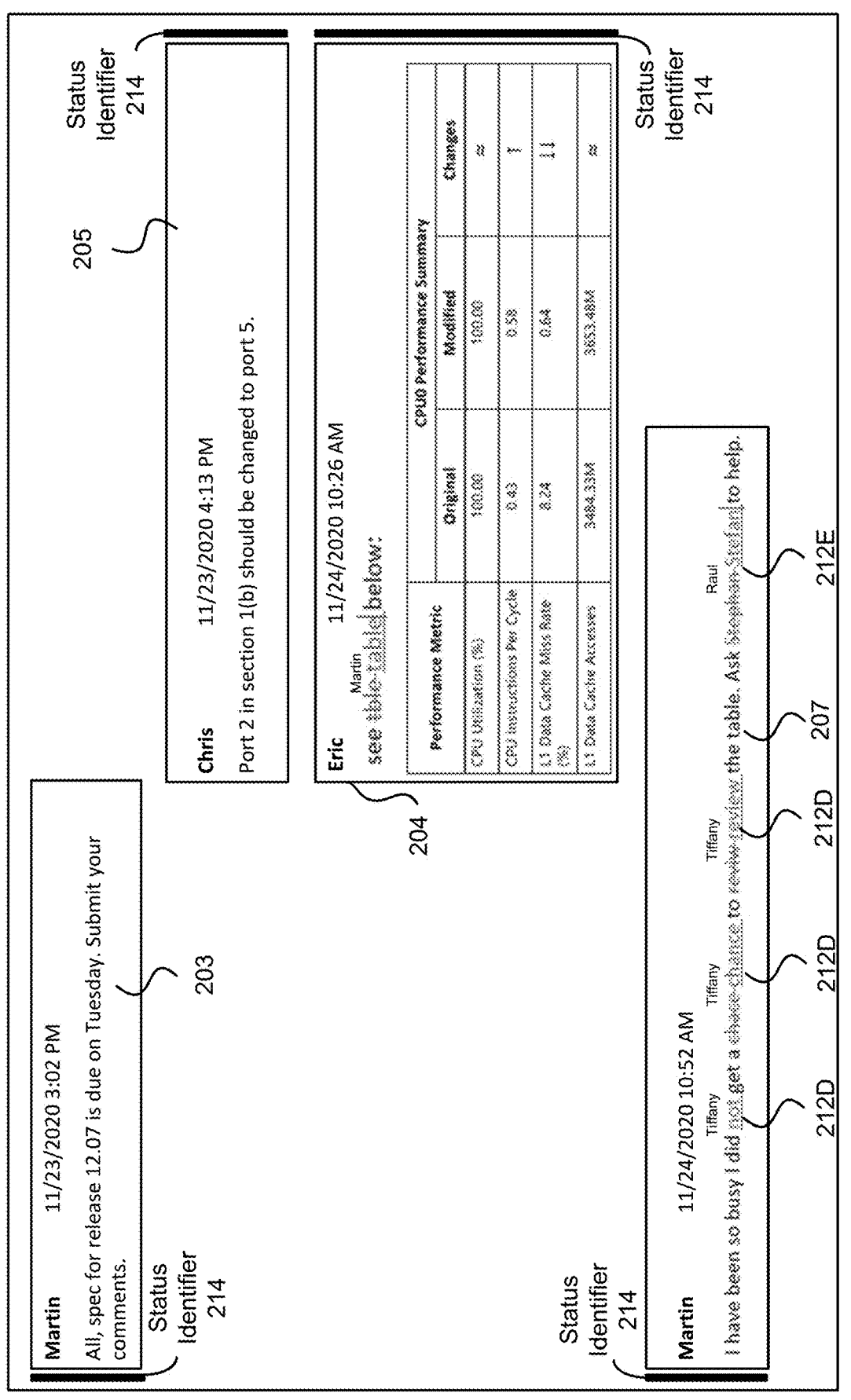
FIG. 2K shows other users of the online group editing posted messages according to some embodiments.

Referring now to FIG. 2K, other users of the online group editing posted messages, according to some embodiments, is shown. Users of the online chat group may display the history of the changes in their respective GUI by activating the status identifier 214 associated with a posted electronic message. In this nonlimiting example, other users of the online chat group, Tiffany and Raul may propose changes to the posted message 206 of FIG. 2J to form a modified posted electronic message 207, similar to the process discussed above. It is appreciated that the identity of the users proposing and making the changes to the posted message(s) may be displayed. In this nonlimiting example, the identity 212D of Tiffany may be reflected and displayed in close proximity to the edits being made by Tiffany, whereas the identity 212E of Raul may be reflected and displayed in close proximity to the edits being made by Raul. It is appreciated that the changes may be accepted, rejected, modified, or feedback from other users may be requested, as described above. It is also appreciated, that in some embodiments, a subset of the users of the online chat group may have unrestricted authority to make changes without requiring a confirmation by the originator of the message. Also, as described above, some users may have tiered editing privileges to make certain changes without requiring confirmation by the originator of the messages, whereas other changes may require a confirmation by the originator of the electronic message.

It is appreciated that each user of the online chat group develops a history that is tracked, based on prior edits (either within the same online chat group or other online chat groups), based on accuracy of the changes proposed by the user from prior edits, based on the user's background (e.g., user's title, user's education, user's organization/team, etc.), based on the relationship of the user to other users and the host of the online chat group, based on the alignment of the content in the posted messages and the user's expertise (e.g., messages discussing artificial intelligence and the user working for an artificial intelligence group), etc. The tracked history can be used to calculate a confidence score associated with each user. As a non-limiting example, the confidence score can be assigned to each user of every chat group when the chat group is initially created. As such, the same user can have different confidence scores in different chat groups. For example, after the initial creation of the chat group, each user may be assigned a confidence score equal to 5 of 10, where 10 represents the most trustworthy and 1 represents the least trustworthy. During communications in the chat group, and all actions taken by the user for suggesting edits and/or voting for or against edits will affect his/her confidence score (e.g. each correct typo correction increases the confidence score by 0.25 points, each wrong typo correction decreases the confidence score by 0.25 points, each correct content correction increases the confidence score by 0.75 points, and each wrong content correction decreases the confidence score by 0.75 points). The confidence score can be used by other users to make an informed decision on the appropriate course of action regarding messages those other users have originated and to which changes have been made or proposed by the user, e.g., accepting the changes, rejecting the changes, proposing additional edits, requesting input and feedback from other users of the online chat group, etc. For example, if a user has a low confidence score, reflecting the fact that the user is often making inappropriate changes to posted messages then perhaps the more appropriate course of action is to investigate the changes, whereas changes being proposed by a user with a higher confidence score may be accepted with minimal investigation and with more reassurance that the changes being proposed by the user are appropriate. It is appreciated that the confidence score associated with each user may be displayed in close proximity to the identity of the user proposing or making changes to the posted messages. For example, in some embodiments, the confidence score associated with Tiffany may be displayed close to the identity 212D, thereby enabling the message originator (i.e., Martin) to make an informed decision on whether to accept the changes. In another example, calculations of votes for or against edits can be made by using the confidence score as a multiplier to each user's one vote.

It is appreciated that in some embodiments, NLP and sentiment analysis is used to analyze the posted messages. The context for each posted message may be determined, and based on that context, it may be determined whether changes to a given posted message are appropriate to improve the accuracy, correctness, or general quality of the message. For example, a posted message 206 may read "I have been so busy I did get a chance to review the table." Processing the message 206 using NLP indicates that the Martin probably inadvertently left out "n't" at the end of "did" in the posted message. As such, appropriate changes to the posted message may be suggested to the originator of the posted message or it may automatically be made by the communication system.

In some embodiments, a machine learning algorithm may be used for sentiment analysis. For example, a machine learning algorithm used for sentiment analysis may leverage NLP, text analysis, computational linguistics, biometrics, etc., to identify, extract and quantify the information contained in the posted message. In one nonlimiting example, a sentiment analysis may identify the emotional state of the posted message as "unhappy" whereas the NLP processing may indicate otherwise, thereby enabling the algorithm to flag the posted message as missing a phrase, e.g., the posted message may indicate "I'm happy with the progress" but sentiment analysis may reveal that deadlines have been missed and the product launch has been postponed, thereby highly indicative that a phrase "not" has been inadvertently left out from the posted message "I'm happy".

It is appreciated that in some embodiments, communication between a subset of the users of the online chat group (within the chat environment or outside) may reveal that there is confusion with respect to a posted message. For example, online chats between a subset of the users of the online chat group, email exchanges between the users, content of audio calls between users, etc., may reveal that a significant number of users are confused about the table referred to by Eric in the posted electronic message 204. As such, remedial actions may be taken, e.g., originator of the posted message Eric may be notified to take appropriate action, the posted message may be modified, etc.

Accordingly, it is appreciated that not only a platform for editing posted electronic messages is provided to the users within the online chat group but also that NLP processing as well as processing of other communications between the users may be leveraged to identify errors or sources of confusion caused by a posted message. As such, remedial actions may be taken, e.g., a posted message may be edited, clarifying messages may be posted, etc.

In some nonlimiting examples, the communication system may check other platforms, e.g., other chat systems, emails, etc., when the edited message is accepted, e.g., by the originator of the posted message, by most of the users in the the chat the systems, etc., to determine whether the accepted changes are appropriate (i.e., correct) or whether additional changes are needed (whether in the current communication system platform or within the other platforms such as other chat systems). It is appreciated that in some embodiments, changes may be proposed in the other platforms as opposed to the current communication platform. The determination may be made by performing direct querying, by performing key word search, etc. The communication system may automatically make appropriate changes based on the determination that changes needed to be made and further based on the content of the posted message and that unedited message(s) has been edited. All or a subset of the users may be notified that changes have been made. It is appreciated that in some nonlimiting examples, the originator of the message in another chat may be notified that a posted message originated by the originator should be edited to reflect these changes.

In yet another embodiment, the communication system may track other communications of the users of the current chat environment to determine if the unedited posted messages (i.e., information) has been used to make a decision. For example, Chris may ask to change the port from 2 to 5 in section 1(b). After the request from Chris, Raul in another chat with developers may post a message stating "it seems I know where to route this request, let's use port 2". After Eric edits Chris' post about ports, the communication system may determine that the post from Raul with developers in another chat should also be edited. This determination may be made based on the content (key words 2 and port) and the context (timestamp associated with a message, originator of the message, area of the message, recipients of the message, etc.). In contrast, if Raul posts in another chat with his sailing friends a message that we need to change a port for our yacht from $2^{nd}$ to $5^{th}$ then he should not be notified because context of the message is completely different even when key words are similar. It is appreciated that the determination of whether changes need to be made in another communication system, e.g., another chat environment, because of a decision that was made may be made based on context information from another chat or another communication, as illustrated above.

Figure 3A:
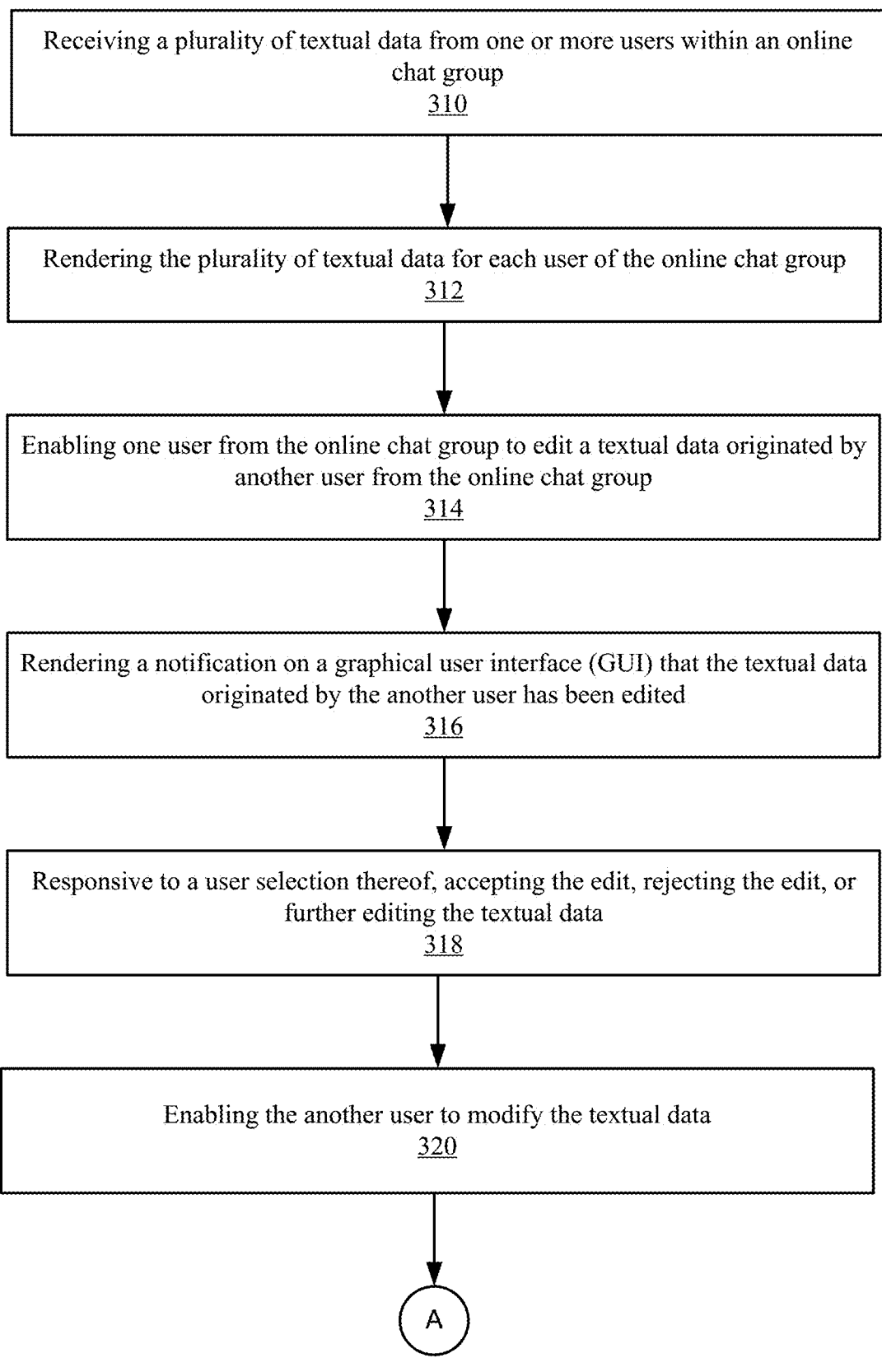
FIGS. 3A-3C show a flow chart for editing posted message according to some embodiments.
Figure 3B:
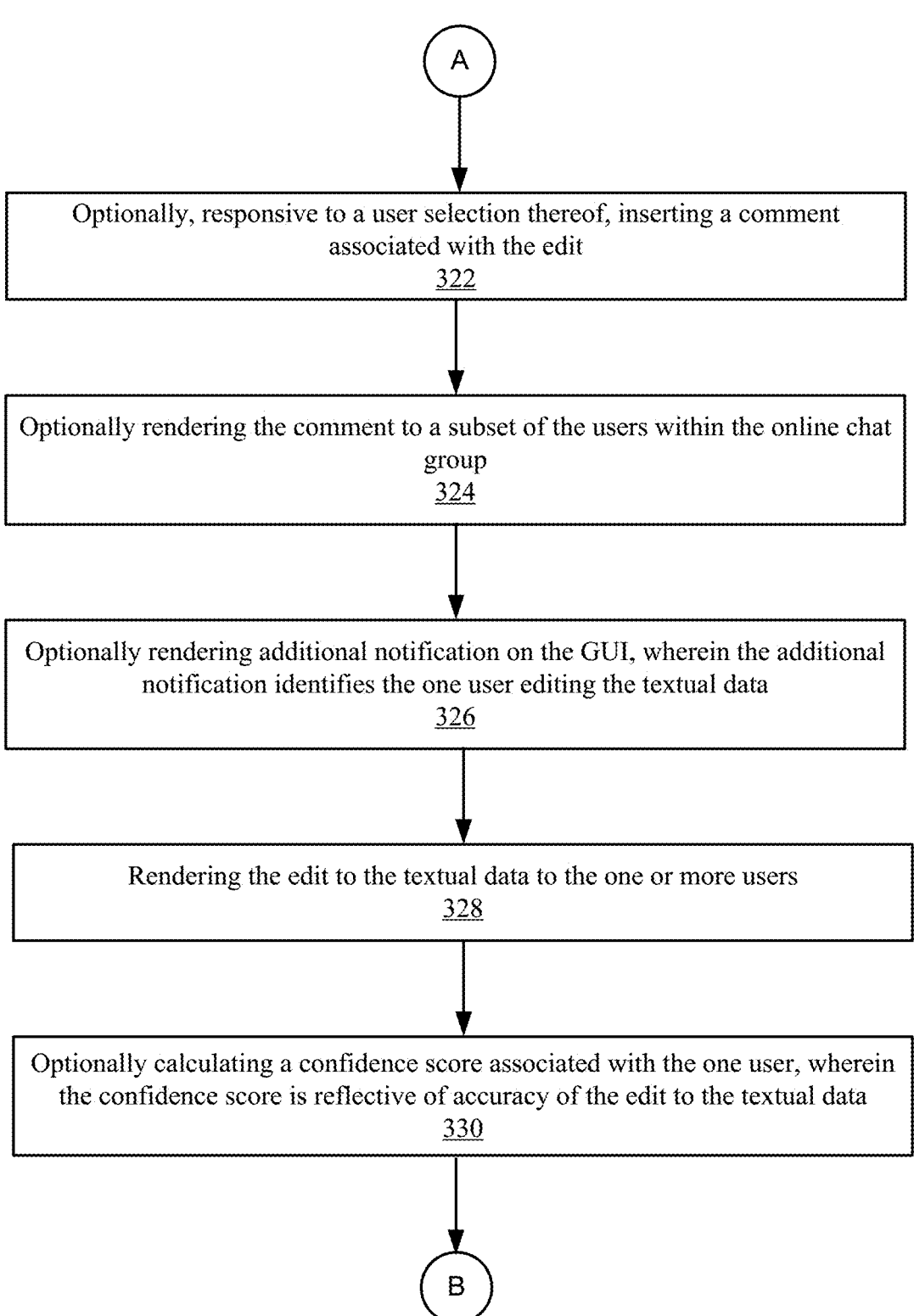
Figure 3C:
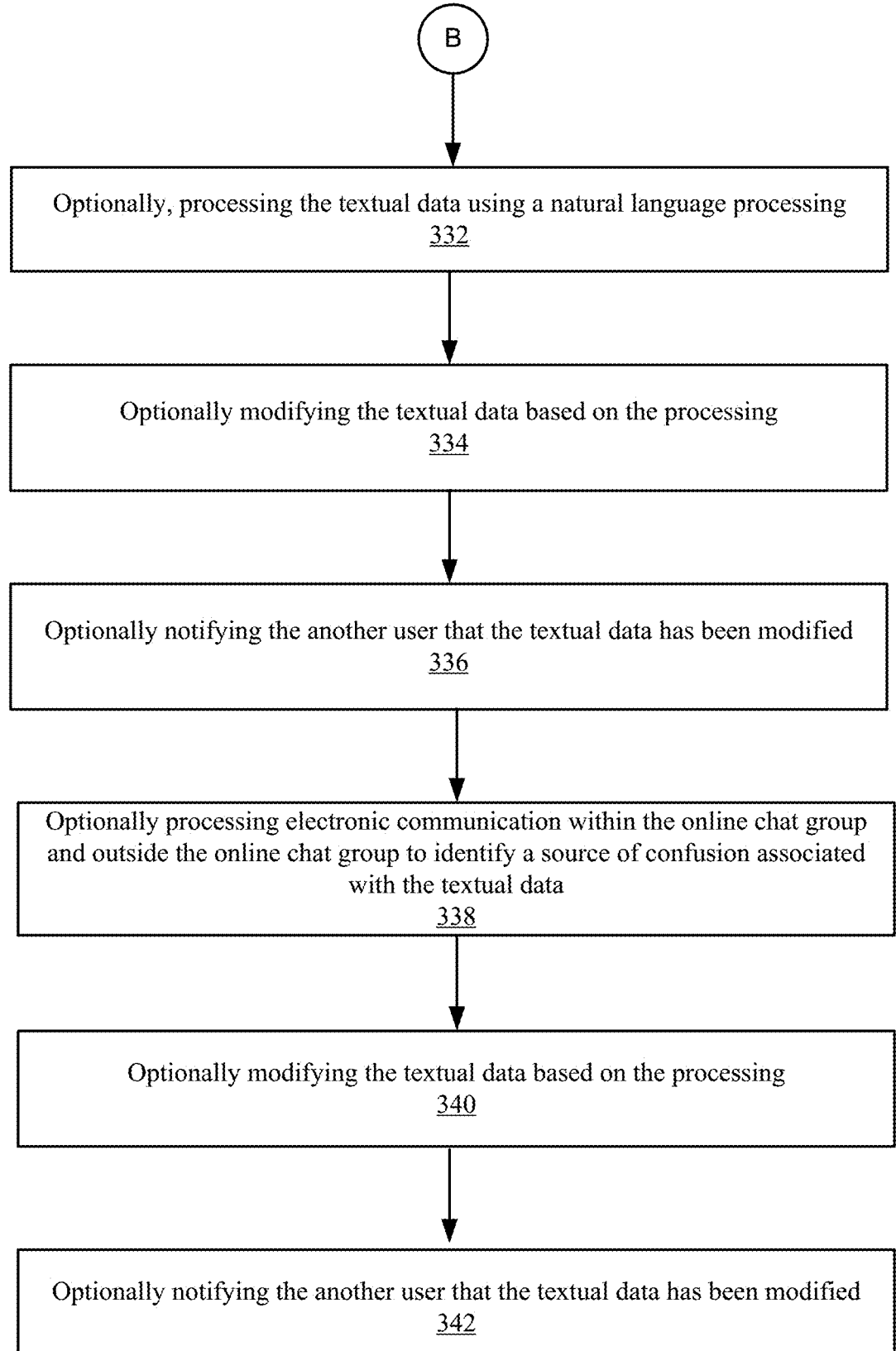

FIGS. 3A-3C show a flow chart for editing posted messages according to some embodiments. The process starts at step 310 by receiving a plurality of textual data from one or more users within an online chat group, for example as described in FIGS. 2A-2K. At step 312, the process continues by rendering the plurality of textual data for each user of the online chat group, for example as described in FIGS. 2A-2K. The process continues at step 314, enabling one user from the online chat group to edit a textual data originated by another user from the online chat group, for example as described in FIGS. 2B-2C, 2G, 2H, and 2K. At step 316, the process continues by rendering a notification on a graphical user interface (GUI) that the textual data originated by the another user has been edited, for example as described in FIGS. 2C and 2E. At step 318, the process continues in response to a user selection thereof, accepting the edit, rejecting the edit, or further editing the textual data, for example as described in FIGS. 2B, 2D, 2E, 2F, 2I, and 2J. At step 320, the process continues by enabling the another user to modify the textual data, for example as described in FIGS. 2B, 2C, 2E, 2F, 2H, and 2K.

The process continues at step 322 optionally, in response to a user selection thereof, by inserting a comment associated with the edit, for example as described in FIG. 2F. At step 324, the method optionally includes rendering the comment to a subset of the users within the online chat group, for example as described in FIG. 2F. At step 326, the method optionally includes rendering additional notification on the GUI, wherein the additional notification identifies the one user editing the textual data, for example as described in FIGS. 2C, 2D, 2G, 2H, 2J, and 2K. At step 328, the method includes rendering the edit to the textual data to the one or more users, for example as described in FIG. 2K. At step 330, the method optionally includes calculating a confidence score associated with the one user, wherein the confidence score reflects the accuracy of the edit to the textual data, for example as described in FIGS. 2D and 2I.

The process continues at step 332, where the method optionally includes processing the textual data using a natural language processing, for example as described in FIG. 2K. At step 334, the method optionally includes modifying the textual data based on the processing, for example as described in FIG. 2K. At step 336, the method optionally includes notifying the another user that the textual data has been modified, for example as described in FIGS. 2C and 2E. At step 338, the method optionally includes processing electronic communication within the online chat group and outside the online chat group to identify a source of confusion associated with the textual data, for example as described in FIG. 2K. At step 340, the method optionally includes modifying the textual data based on the processing, for example as described in FIG. 2K. At step 342, the method optionally includes notifying the another user that the textual data has been modified, for example as described in FIGS. 2C and 2E.

Figure 4:
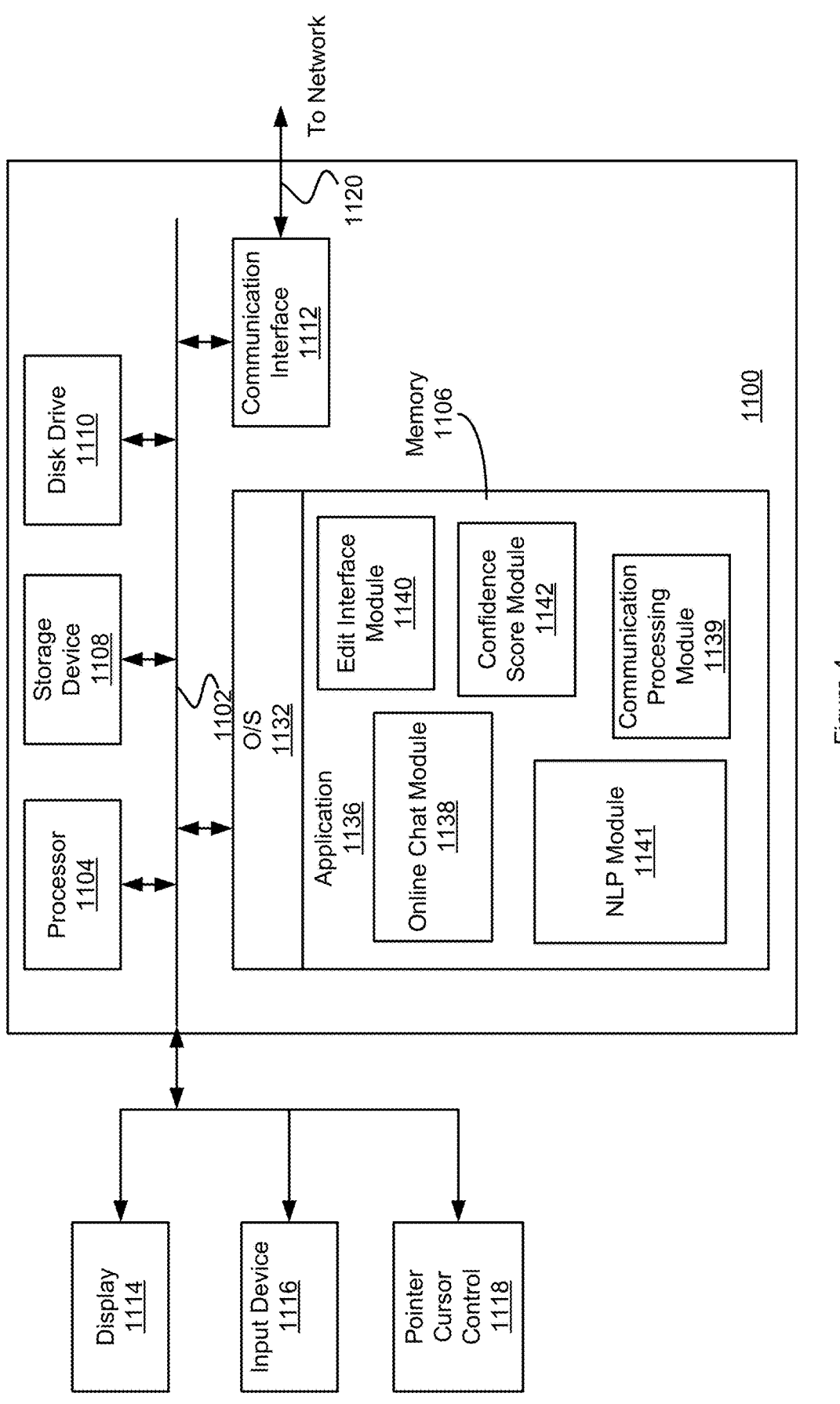
FIG. 4 is a block diagram depicting an example of computer system suitable for editing posted message in accordance with some embodiments.

Referring now to FIG. 4, an exemplary block diagram of a computer system suitable for editing posted messages in accordance with some embodiments is shown. In some examples, computer system 1100 can be used to implement computer programs, applications, methods, processes, or other software to perform the above-described techniques and to realize the structures described herein. Computer system 1100 includes a bus 1102 or other communication mechanism for communicating information, which interconnects subsystems and devices, such as a processor 1104, a system memory ("memory") 1106, a storage device 1108 (e.g., ROM), a disk drive 1110 (e.g., magnetic or optical), a communication interface 1112 (e.g., modem or Ethernet card), a display 1114 (e.g., Cathode Ray Tube (CRT) or Liquid Crystal Display (LCD)), an input device 1116 (e.g., keyboard), and a pointer cursor control 1118 (e.g., mouse or trackball). In one embodiment, pointer cursor control 1118 invokes one or more commands that, at least in part, modify the rules stored, for example in memory 1106, to define the electronic message preview process.

According to some examples, computer system 1100 performs specific operations in which processor 1104 executes one or more sequences of one or more instructions stored in system memory 1106. Such instructions can be read into system memory 1106 from another computer readable medium, such as static storage device 1108 or disk drive 1110. In some examples, hard-wired circuitry can be used in place of or in combination with software instructions for implementation. In the example shown, system memory 1106 includes modules of executable instructions for implementing an operating system ("OS") 1132, an application 1136 (e.g., a host, server, web services-based, distributed (i.e., enterprise) application programming interface ("API"), program, procedure or others). Further, application 1136 includes a module of executable instructions for online chat module 1138 that enables chat communication between the members of the online group, edit interface module 1140 to enable a user within the online chat group to edit a posted message, NLP module 1141 to process the posted electronic messages and identify context of the posted message, confidence score module 1142 to calculate a confidence score associated with each user of the online chat group, and communication processing module 1139 for processing communication within the online chat environment and outside to identify a source of confusion associated with a particular posted electronic message.

The term "computer readable medium" refers, at least in one embodiment, to any medium that participates in providing instructions to processor 1104 for execution. Such a medium can take many forms, including but not limited to, non-volatile media, volatile media, and transmission media. Non-volatile media includes, for example, optical or magnetic disks, such as disk drive 1110. Volatile media includes dynamic memory, such as system memory 1106. Transmission media includes coaxial cables, copper wire, and fiber optics, including wires that comprise bus 1102. Transmission media can also take the form of acoustic or light waves, such as those generated during radio wave and infrared data communications.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, electromagnetic waveforms, or any other medium from which a computer can read.

In some examples, execution of the sequences of instructions can be performed by a single computer system 1100. According to some examples, two or more computer systems 1100 coupled by communication link 1120 (e.g., Local Access Network (LAN), Public Switched Telephone Network (PSTN), or wireless network) can perform the sequence of instructions in coordination with one another. Computer system 1100 can transmit and receive messages, data, and instructions, including program code (i.e., application code) through communication link 1120 and communication interface 1112. Received program code can be executed by processor 1104 as it is received, and/or stored in disk drive 1110, or other non-volatile storage for later execution. In one embodiment, system 1100 is implemented as a hand-held device. But in other embodiments, system 1100 can be implemented as a personal computer (i.e., a desktop computer) or any other computing device. In at least one embodiment, any of the above-described delivery systems can be implemented as a single system 1100 or can implemented in a distributed architecture including multiple systems 1100.

In other examples, the systems, as described above can be implemented from a personal computer, a computing device, a mobile device, a mobile telephone, a facsimile device, a personal digital assistant ("PDA") or other electronic device.

In at least some of the embodiments, the structures and/or functions of any of the above-described interfaces and panels can be implemented in software, hardware, firmware, circuitry, or a combination thereof. Note that the structures and constituent elements shown throughout, as well as their functionality, can be aggregated with one or more other structures or elements.

Alternatively, the elements and their functionality can be subdivided into constituent sub-elements, if any. As software, the above-described techniques can be implemented using various types of programming or formatting languages, frameworks, syntax, applications, protocols, objects, or techniques, including C, Objective C, C++, C#, Flex™, Fireworks™, Java™, Javascript™ Asynchronous JavaScript and extensible Markup Language (XML) (AJAX), Common Business-Oriented Language (COBOL), Fortran, Ada programming language (ADA), XML, Hyper-Text Markup Language (HTML), Dynamic HyperText Markup Language (DHTML), extensible HyperText Markup Language (XHTML), HyperText Transfer Protocol (HTTP), (Extensible Messaging and Presence Protocol (XMPP), and others. These can be varied and are not limited to the examples or descriptions provided.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear to persons having ordinary skill in the art to which the embodiments pertain, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. A method, comprising:
   receiving, by a processor, a message from a first user within an online chat group;
   rendering, via a graphical user interface (GUI), the message for each user in the online chat group;
   enabling a second user from the online chat group to edit a content of the message via a GUI associated with the second user;
   receiving edits to the content of the message from the second user via the GUI associated with the second user;
   calculating a confidence score for the edit of the content, wherein the confidence score reflects an accuracy of the edit and wherein calculating the confidence score is further based on evaluating a number of edits proposed by the second user that have been either accepted or rejected by users other than the first user and the second user;
   rendering, on a GUI of the first user, a notification that the message has been edited, wherein the notification includes the confidence score;
   rendering selectable means for accepting the edit, rejecting the edit, and further editing the message on the GUI of the first user for user selection thereof; and
   receiving a user selection from the first user, via the GUI of the first user, wherein the user selection includes at least one of the accepting the edit, rejecting the edit, or further editing the message.

2. The method as described in claim 1, wherein the content of the message is a transcription of a video or audio conference.

3. The method as described in claim 1, wherein calculating the confidence score is further based on a number of prior typo edits, proposed by the second user, that have been accepted or rejected.

4. The method as described in claim 1, wherein calculating the confidence score is further based on a background of the second user in comparison to the content of the message.

5. The method as described in claim 1, wherein calculating the confidence score is further based on a relationship between the first user and the second user.

6. The method as described in claim 1, further comprising:
   in response to the selection of the first user thereof, inserting a comment associated with the edit; and
   rendering the comment to each user within the online chat group.

7. The method as described in claim 1, further comprising rendering the edit for each user.

8. The method of claim 1 further comprising:
   performing natural language processing (NLP) on the message by the first user;
   determining a context associated with the message; and
   determining whether a modification to the message is to be made based on the context.

9. A browser-based method, comprising:
   receiving, by a processor, a message from a first user within an online chat group;
   rendering, via a graphical user interface (GUI), the message for each user in the online chat group;
   enabling a second user from the online chat group to edit a content of the message via a GUI associated with the second user;
   receiving edits to the content of the message from the second user via the GUI associated with the second user;
   calculating a confidence score for the edit of the content, wherein the confidence score reflects an accuracy of the edit and wherein calculating the confidence score is further based on evaluating a number of edits proposed by the second user that have been either accepted or rejected by users other than the first user and the second user;
   rendering, on a GUI of the first user, a notification that the message has been edited, wherein the notification includes the confidence score;
   rendering selectable means for accepting the edit, rejecting the edit, and further editing the message on the GUI of the first user for user selection thereof; and
   receiving a user selection from the first user, via the GUI of the first user, wherein the user selection includes at least one of the accepting the edit, rejecting the edit, or further editing the message.

10. The browser-based method as described in claim 9, wherein the content of the message is a transcription of a video or audio conference.

11. The browser-based method as described in claim 9, wherein calculating the confidence score is further based on a number of prior typo edits, proposed by the second user, that have been accepted or rejected.

12. The browser-based method as described in claim 9, wherein calculating the confidence score is further based on a background of the second user in comparison to the content of the message.

13. The browser-based method as described in claim 9, wherein calculating the confidence score is further based on a relationship between the first user and the second user.

14. The browser-based method as described in claim 9, further comprising:
   in response to the selection of the first user thereof, inserting a comment associated with the edit; and
   rendering the comment to each user within the online chat group.

15. The browser-based method as described in claim 9, further comprising rendering the edit for each user.

16. A system, comprising:

a processor;

a memory operatively connected to the processor and storing instructions that, when executed by the processor, cause:

receiving, by the processor, a message from a first user within an online chat group;

rendering, via a graphical user interface (GUI), the message for each user in the online chat group;

enabling a second user from the online chat group to edit a content of the message via a GUI associated with the second user;

receiving edits to the content of the message from the second user via the GUI associated with the second user;

calculating a confidence score for the edit of the content, wherein the confidence score reflects an accuracy of the edit and wherein calculating the confidence score is further based on evaluating a number of edits proposed by the second user that have been either accepted or rejected by users other than the first user and the second user;

rendering, on a GUI of the first user, a notification that the message has been edited, wherein the notification includes the confidence score;

rendering selectable means for accepting the edit, rejecting the edit, and further editing the message on the GUI of the first user for user selection thereof; and receiving a user selection from the first user, via the GUI of the first user, wherein the user selection includes at least one of the accepting the edit, rejecting the edit, or further editing the message.

17. The system as described in claim 16, wherein the content of the message is a transcription of a video or audio conference.

18. The system as described in claim 16, wherein calculating the confidence score is further based on a number of prior typo edits, proposed by the second user, that have been accepted or rejected.

19. The system as described in claim 16, wherein calculating the confidence score is further based on a background of the second user in comparison to the content of the message.

20. The system as described in claim 16, wherein calculating the confidence score is further based on a relationship between the first user and the second user.

21. The system as described in claim 16, wherein the instructions further comprise:

in response to a selection of the first user thereof, inserting a comment associated with the edit; and rendering the comment to each user within the online chat group.

* * * * *